Dec. 26, 1944.  J. W. STEVENSON  2,365,782
BOX STACK CONVEYER AND ELEVATOR
Original Filed Jan. 11, 1937  2 Sheets-Sheet 1
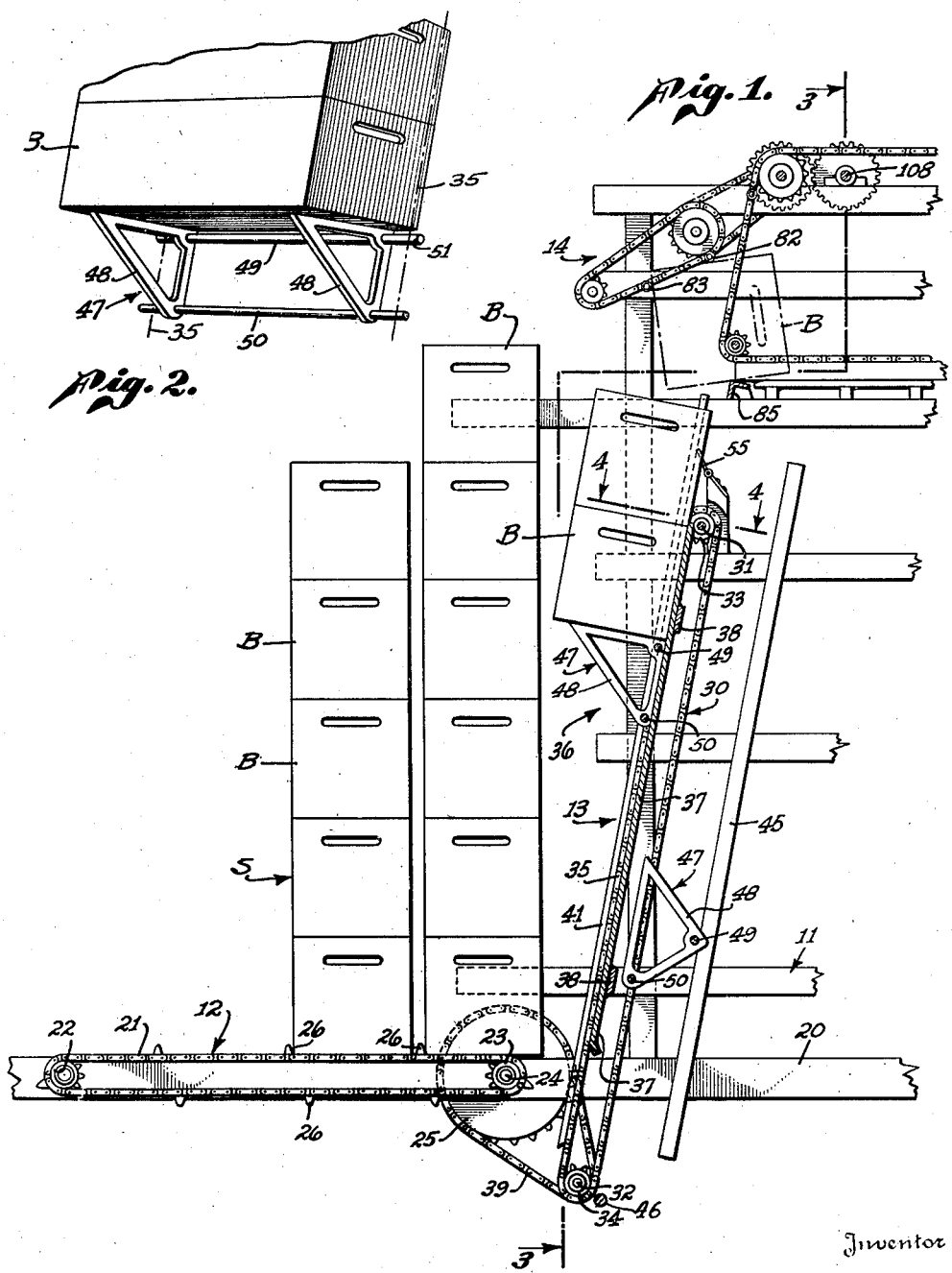
Inventor
JAMES W. STEVENSON, deceased,
By GLADYS STEVENSON, Adminis.
Attorney Dec. 26, 1944. J. W. STEVENSON 2,365,782
BOX STACK CONVEYER AND ELEVATOR
Original Filed Jan. 11, 1937 2 Sheets-Sheet 2

Inventor
JAMES W. STEVENSON, deceased
By GLADYS STEVENSON, Adminis.
By Herbert A. Huebner
Attorney Patented Dec. 26, 1944

2,365,782

UNITED STATES PATENT OFFICE

2,365,782

BOX STACK CONVEYER AND ELEVATOR

James W. Stevenson, deceased, late of Riverside, Calif., by Gladys Stevenson, administratrix, Riverside, Calif., assignor to Food Machinery Corporation (Riverside Division), a corporation Application April 3, 1939, Serial No. 265,655, which is a division of application Serial No. 119,989, January 11, 1937. Divided and this application March 13, 1941, Serial No. 383,178

13 Claims. (Cl. 198—158)

This invention refers to box stack conveyers and elevators and is particularly directed to improvements in mechanisms which are suitable for moving and elevating loaded and empty boxes.

This invention has many different applications and possesses a wide range of utility. It may be useful in many industries, but has special utility in the citrus industry wherein fruit is handled in boxes during the harvest and packing seasons.

For purposes of illustration, therefore, but not in limitation of the invention, an embodiment of this invention designed for use in citrus packing houses is disclosed herein.

Citrus fruits are generaly harvested by hand and are then transported to the packing house from the groves, in what are known as "field boxes." There the loaded boxes are disposed in stacks generally ranging from 5 to 8 boxes high. When it is desired to remove the fruit from the boxes and subject it to a series of treatments whereby it is prepared for shipping and market, the fruit must be dumped from the boxes containing it and the empty boxes delivered to empty box storage. Clamp trucks are provided by which an entire stack of boxes may be easily handled and moved from place to place on the packing house floor by a single worker.

It is a general object of this invention to provide a machine to which loaded boxes may be delivered in the form of stacks and then elevated in timed relation to a position which permits the contents to be dumped from the boxes.

Another object of this invention is the provision of a box stack handling device which will deliver individual boxes of series of stacks successively to a box dumper or other mechanism so that the interval of time between the delivery of the last box of each stack and the first box in the next succeeding stack is the same as the intervals between the delivery of successive boxes in a given stack.

A further specific object of this invention is to provide in a machine of the character described a box stack elevator for the synchronized delivery of boxes of fruit so as to permit the handling and treatment of the fruit in conformity with time schedules and thereby to prevent any possible occurrence of interruption and delay.

This application is a division of applicant's co-pending application, filed April 3, 1939, Serial No. 265,655, which is a division of the co-pending application filed January 11, 1937, Serial No. 119,989, the latter having issued as Patent No. 2,161,836. In the last named application there was illustrated and described a box stack dumper and restacker, as those two units may be cooperatively utilized to unstack and dump loaded boxes, convey the empty boxes to a suitable point and then restack them. The claims in that case relate to the restacker. The claims now in the second or later filed case relate to the dumping or unloading means. In the present case, the claims are directed to the conveyer which feeds the stacks to the elevator and to the elevator which handles the stacks of loaded boxes and delivers them successively to the dumping mechanism in timed relationship. For that reason, it is not necessary to fully illustrate and describe the dumping means, although a portion thereof is illustrated in the drawings, merely to show the environment in which the present invention is intended for use, as the elevator will operate independently of the dumping or unloading means. This case primarily illustrates, describes and claims only the units comprising the box stack conveyer and elevator.

Other objects and advantages will become apparent from a further description of this invention and reference to the accompanying drawings.

In the drawings:

Figure 1 is a diagrammatic cross sectional view of a preferred embodiment of this invention.

Figure 2 is a perspective view of one of the stack lifting cradles.

Figure 3:
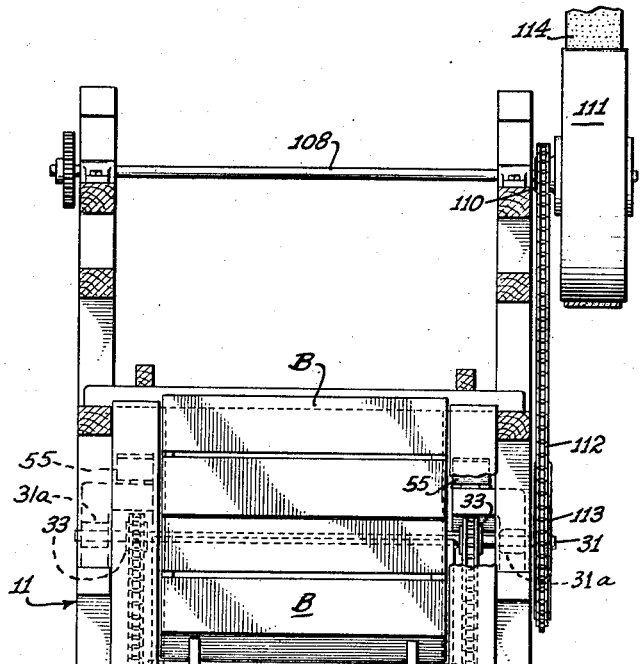
Figure 3 is a front elevation, partly in section, taken on the lne 3—3 of Figure 1.
Figure 4:
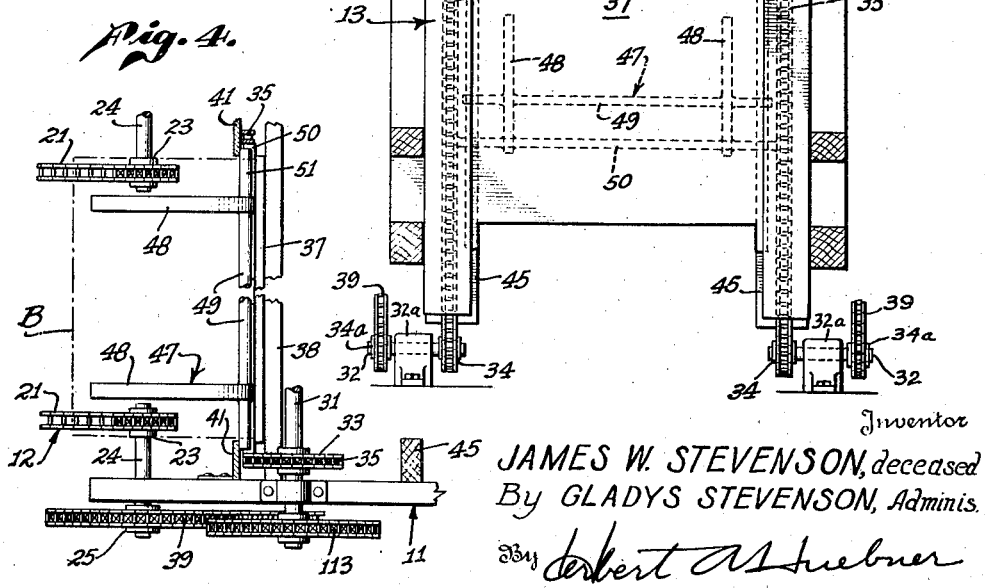
Figure 4 is a fragmentary cross-section, taken on the line 4—4 of Figure 1.

Referring to Figure 1, the machine illustrative of the preferred form of this invention comprises a stack feed conveyer 12 and a stack elevator 13. The stack feed conveyer 12 is mounted in a floor 20 upon which the frame 11 rests and comprises a pair of chains 21 which pass around idle sprockets 22 and drive sprockets 23, the latter being fixed on stub shafts 24 with driven sprockets 25. Provided on the chains 21 are stack spacing lugs 26.

The stack elevator 13 includes an endless chain mechanism 30 having a drive shaft 31 mounted in bearings 31a, stub shafts 32 mounted in bearings 32a, and sprockets 33 and 34 fixed on these respective shafts about which sprockets are trained endless chains 35. Fixed on one of the shafts 32 and disposed outside the bearings 32a are drive sprockets 34a which are connected by endless chains 39 with the driven sprockets 25 so that whenever the sprockets 34 are rotated by the chains 35, the sprockets 25 are also rotated thus setting in motion the box stack feed conveyer 12. The chain mechanism 30 is preferably mounted so as to be inclined away from the stack conveyer 12.

The space just in advance of endless chain mechanism 30 may be termed a stack elevating path 36. Bordering this path and located between the spaced planes in which the respective endless chains 35 travel, and just back of the path 36, is an inclined back plate 37 which is supported on the frame 11 by members 38. Also mounted on the frame 11 and extending substantially parallel with the foremost flights of the chains 35 are guides 41. Spaced back of the chains 35 are provided guides 45 which are secured upon the frame 11.

The stack elevator 13 also includes two stack lifting cradles 47 each of which comprises a pair of right triangular frames 48 which are connected at their right angular vertices by a cross bar 49. The lower vertices of the triangular frames 48 are connected by a cross bar 50, the extending ends of which are pivotally connected to the chains 35 so that each of the cradles 47 is supported on these chains. Extending ends of the bar 49 form guide pins 51 which slide against inner faces of guides 41 as shown in Figure 2.

When the chains 35 are caused to traverse their endless pathway by the rotation of shaft 31, each of the cradles 47 is caused to travel upwardly when it is disposed in the path 36, the cross bars 49 and 50 being guided at this time between the back plate 37 and the inner edge portions of the guides 41. During this upward travel of a particular cradle 47, the center of gravity of that cradle, as well as any weight which may be imposed on it, maintains the pins 51 of such cradle pressed against the inner edge portions of the guides 41. Thus, as this cradle is propelled upwardly above the sprocket 31, it remains in the same rising position in which the rising cradle is shown in Figure 1 until the pins 51 thereof engage traps 55 on the downward movement of the cradle which start rocking this cradle rearwardly. The frames 48 of this cradle then engage the shaft 31 causing the cradle to flop backward until the pins 51 engage guides 45 as shown in Figure 1. While the shaft 31 could be depended upon for swinging each cradle 47 backward as this cradle starts downward from the upper limit of its travel, starting the cradle backward by the traps 55 decreases the velocity imparted to the cradle in this swinging movement. On the other hand, if the shaft 31 were not continuous between the sprockets 33, and were by-passed by the cradle, the traps 55 might alone serve to swing the cradle 47 across center backwardly.

Approaching the lower end of the chains 35, the downwardly moving cradle 47 is swung forwardly by engagement of the cradle frames 48 with a fixed bar 46. The center of gravity of the descending cradle 47 thus shifts forward of the cross bar 50 of this cradle with the result that the cradle swings over until the pins 51 thereof engage the lower ends of the guides 41. A complete cycle of travel of one of the cradles 47 has now been described.

To set the device in operation power is applied through a belt 114 to a pulley 111 so as to rotate the latter. This rotates a shaft 108 which through sprockets 110 and 113 and chain 112 rotate the shaft 31 which sets in motion both the stack elevator 13 and the stack feeder 12.

When the machine has thus been started, the attendant trucks stacks S of loaded boxes B from their place of storage on the floor of the packing house and sets these down on the chains 21 of the feed conveyer 12 between the lugs 26 as shown in Figure 1. The lugs 26 are so spaced on the chains 21 that these stacks S are successively delivered, with the lowermost box in the stack extending into the elevating path 36, just as one of the cradles 47 rises upwardly into position to support this stack, tilts it into position in the path 36 against the back plate 37, and starts elevating it upwardly towards a box dumping mechanism 14. The latter mechanism is preferably so timed that as each of the boxes B in a stack S being thus elevated comes into a certain position relative to the dumping mechanism, which may be termed a "dumping position," a bar 82 engages the side of this box and starts to tip it toward the right against an angle iron fulcrum bar 85. As the bar 82 completes its tilting action on the side of this box, a bar 83 comes into play against the bottom of the box and continues the rocking of the latter with the result that the box is dumped over completely on its side. After the box under discussion has remained on its side a sufficient length of time for the fruit to gravitate entirely therefrom into a hopper (not shown), the box is lifted and is carried away by cooperation of the dumping mechanism and the empty box conveyer which are not shown. Any other suitable disposition of the loaded boxes being elevated may be provided for, the box dumping mechanism illustrated being merely a suggestion.

As the first of the boxes is thus dumped and the empty box carried away, the next box of the stack is being lifted upwardly into a dumping position. As the box reaches this position, the cross bar 82 moves into contact with the adjacent side of the box so as to initiate the dumping of this box as already described for the first box. In this manner, the boxes of the stack S are successively lifted and dumped and the empty boxes may be carried toward a stacker such as is illustrated and described in applicant's said U. S. Patent No. 2,161,836.

It will be noted that the relatively rapid retraction of each of the cradles 47 from out of the path 36 just after the lowermost box of each stack has been delivered to the dumping mechanism 14, permits the next succeeding stack S to be tilted into place in the elevating path 36 so that the topmost box of the new stack is elevated into dumping position and is dumped with the same time interval between this and the dumping of the lowermost box of the preceding stack as elapsed between the dumping of a successive box in a given stack. Thus, the conveying and dumping of fruit in the operation of this machine is at a uniform rate, there being no fluctuation in the intervals between the dumping of successive boxes so long as the feed conveyer 12 is kept supplied with stacks S.

Of course, some box handling apparatus other than the dumper shown may be employed, this not being any part of the claimed subject matter in the present application.

While applicant has shown and described a preferred form of box stack conveyer and elevator designed for a citrus fruit packing house, the invention may be embodied in various other equivalent forms and is applicable to numerous other adaptations.

What is claimed is:

1. An apparatus for handling loaded boxes comprising: a continuously moving elevator mechanism having lifting cradles spaced thereon so that successive stacks of boxes may be received by an upwardly moving cradle from a source of supply as the preceding cradle reaches the uppermost point in its travel, the elevator mechanism comprising endless chains and the lifting cradles each comprising a pair of right angle brackets pivoted to the chains at the lower ends of the brackets whereby the center of gravity of the brackets and weight carried thereon is in advance of the chains, guide pins at the apex of the right angle brackets, guides against which the pins bear during the upward movement of the brackets, and second guides restraining the brackets on their downward movement from complete rotation.

2. An apparatus for handling loaded boxes comprising: a continuously moving elevator mechanism having lifting cradles spaced thereon and successively disposed for receiving successive stacks of boxes at a fixed loading position as a cradle is upwardly moved and as the preceding cradle reaches the uppermost point in its travel, the elevator mechanism comprising endless chains and the lifting cradles each comprising a pair of right angle brackets pivoted to the chains at the lower ends of the brackets whereby the center of gravity of the brackets and weight carried thereon is in advance of the chains, guide pins at the apex of the right angle brackets, guides against which the pins bear during the upward movement of the brackets, second guides restraining the brackets on their downward movement from complete rotation, and a member positioned at the lower end of the elevator adapted to engage the brackets and thrust them into position to engage a stack of boxes as the upward movement commences.

3. In combination: a cradle having platform means, guide follower means and leg means extending downward from the platform means; a pair of endless chains spaced apart to accommodate said cradle, as aforesaid, therebetween; small diameter sprockets about which said chains are trained to provide parallel closely spaced raising and descending chain flights; means for pivotally attaching lower ends of said leg means to corresponding links of said chains; two fixed guide means located for successive engagement by said follower means, one of said guide means when so engaged supporting said cradle in an extended operative position and the other of said guide means when so engaged supporting said cradle in a retracted inoperative position; and means for rocking said cradle about its attaching pivot to shift said cradle from one of said positions to the other.

4. A combination as in claim 3: in which said cradle retains its operative position while said platform travels substantially the length of said leg means above the upper end of said flights.

5. A combination as in claim 3: in which said guide means are substantially straight and parallel.

6. A combination as in claim 3: in which said guide follower means extends laterally from said platform means.

7. A combination as in claim 3: in which said guide follower means extends laterally from said platform means and when said cradle is in operative position lies substantially in a plane with the cradle's pivot axis and the chain flights then supporting said cradle.

8. A combination as in claim 3: in which said guide means are substantially straight and parallel and said rocking means operates substantially at the top and bottom of said chain flights.

9. A combination as in claim 3: in which the center of gravity of said cradle is at all times disposed above the pivotal connection of said cradle with said chains.

10. A combination as in claim 3: in which said rocking means is dual, and comprises means located at the upper and lower ends of said flights, each of which effects a relatively rapid shift of the cradle as aforesaid, when contacted by the latter.

11. In combination: a cradle; a pair of endless elevator chains spaced apart to accommodate said cradle therebetween; means forming a pivotal connection between said cradle and corresponding links of said chains on an axis disposed below the center of gravity of said cradle; two fixed guide means located between the planes in which said chains respectively travel for successive engagement by said cradle, one of said guide means being engaged by said cradle while it is being lifted, the other of said guide means being engaged by said cradle while it is being lowered, each of said guide means maintaining said cradle with its center of gravity above said axis while said cradle is in contact therewith; and means for swinging said cradle about said axis adjacent the upper and lower limits of its travel to swing said cradle from contact with one of said guide means into contact with the other of said guide means, said cradle being in an operative extended position for supporting a load when in contact with one of said guide means and in an inoperative retracted position when in contact with the other of said guide means.

12. In combination: a pair of endless chains spaced apart; a cradle disposed between said chains and pivotally connected below its center of gravity to said chains so that said cradle is successively lifted and lowered by the continuous operation of said chains in a given direction; guide means located between the planes in which said chains respectively travel adapted to be engaged by said cradle to cooperate with said pivotal connection to support said cradle in an extended position with the center of gravity of said cradle above the axis of said connection and toward said guide means from said axis; a second guide means also located between said planes on the opposite side of said axis from said first guide means and adapted to be engaged by said cradle and cooperate with said pivotal connection to support said cradle in a retracted position with the center of gravity of said cradle above said axis and toward said second guide means from said axis; and means for swinging said cradle from contact with one of said guide means into contact with the other of said guide means to change said cradle from one of said positions to the other of said positions.

13. In combination: a pair of endless chains spaced apart; a cradle disposed between said chains and pivotally connected below its center of gravity to said chains so that said cradle is successively lifted and lowered by the continuous operation of said chains in a given direction; guide means located between the planes in which said chains respectively travel adapted to be engaged by said cradle to cooperate with said pivotal connection to support said cradle in an extended position with the center of gravity of said cradle above the axis of said connection and toward said guide means from said axis; a second guide means also located between said planes on the opposite side of said axis from said first guide means and adapted to be engaged by said cradle and cooperate with said pivotal connection to support said cradle in a retracted position with the center of gravity of said cradle above said axis and toward said second guide means from said axis; and means for swinging said cradle from contact with one of said guide means into contact with the other of said guide means adjacent the upper and lower limits of its travel to change said cradle from one of said positions to the other of said positions.

GLADYS STEVENSON.
*Administratrix of the Estate of James W. Stevenson, Deceased.*